United States Patent
Ravikumar

(10) Patent No.: US 7,569,096 B2
(45) Date of Patent: Aug. 4, 2009

(54) CONFIGURATION AND PROCESS FOR CARBONYL REMOVAL

(75) Inventor: Ravi Ravikumar, Lancaster, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 511 days.

(21) Appl. No.: 10/543,439

(22) PCT Filed: Jan. 28, 2003

(86) PCT No.: PCT/US03/02696

§ 371 (c)(1),
(2), (4) Date: May 3, 2006

(87) PCT Pub. No.: WO2004/069381

PCT Pub. Date: Aug. 19, 2004

(65) Prior Publication Data

US 2007/0036703 A1  Feb. 15, 2007

(51) Int. Cl.
*B01D 53/02* (2006.01)
(52) U.S. Cl. .................. 95/133; 96/131; 110/203; 110/343; 110/345; 423/210
(58) Field of Classification Search .......... 95/133; 110/203, 345
See application file for complete search history.

(56) References Cited

U.S. PATENT DOCUMENTS

| | | | | | |
|---|---|---|---|---|---|
| 3,086,881 | A | * | 4/1963 | Jenkin | 427/252 |
| 4,202,167 | A | * | 5/1980 | Suggitt et al. | 60/780 |
| 5,008,160 | A | * | 4/1991 | Jenkin | 428/656 |
| 6,077,487 | A | * | 6/2000 | Snow | 423/210 |

FOREIGN PATENT DOCUMENTS

| | | |
|---|---|---|
| DE | 3941766 | 6/1991 |
| GB | 723307 | 2/1955 |
| GB | 785383 | 10/1957 |

* cited by examiner

*Primary Examiner*—Frank M Lawrence
*Assistant Examiner*—Christopher P Jones
(74) *Attorney, Agent, or Firm*—Fish & Assoc. PC

(57) ABSTRACT

A plant (100) includes a gas turbine (110) that receives a feed gas (130), wherein a metal plates from a metal carbonyl contained in the feed gas onto a sacrificial metal (152A) in an adsorber (150A), and wherein the feed gas in the adsorber has a temperature sufficient for plating the metal onto the sacrificial metal.

7 Claims, 1 Drawing Sheet

CONFIGURATION AND PROCESS FOR CARBONYL REMOVAL

FIELD OF THE INVENTION

Figure 1:
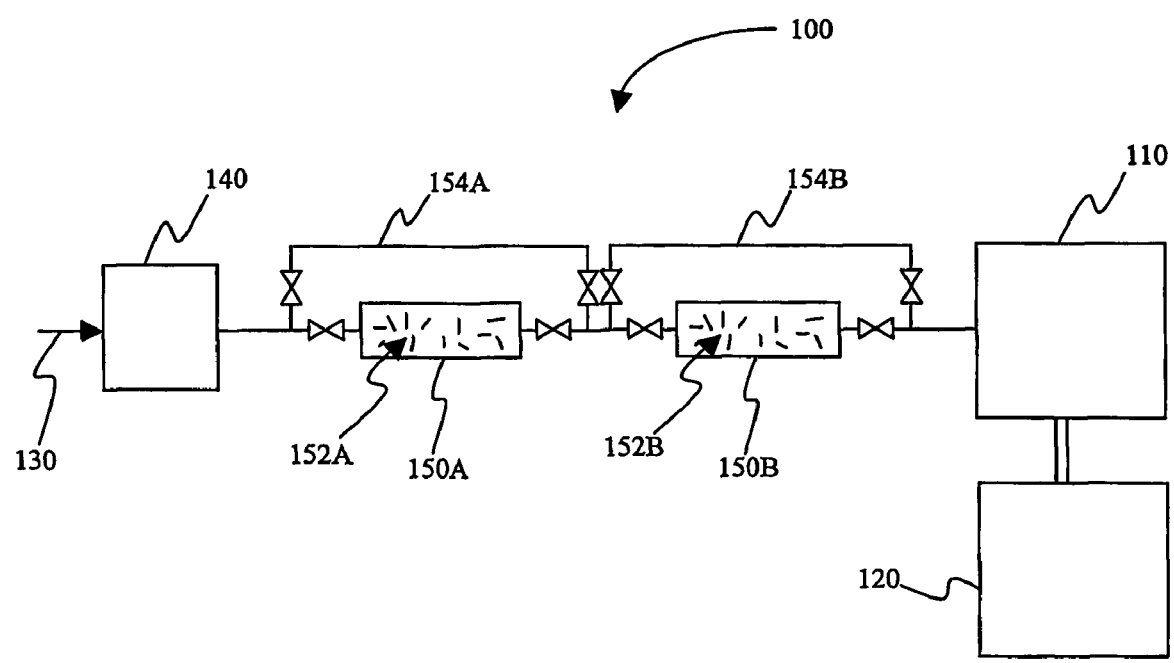

The field of the invention is gas purification, and especially of combustible gases.

BACKGROUND OF THE INVENTION

Gasification of refinery residues, and especially of heavy oil based products (e.g., petroleum coke, visbreaker bottoms, asphaltenes, vacuum bottoms, etc.) to produce a gaseous product referred to as syngas frequently leads to the formation of nickel and iron carbonyls. These carbonyls are typically present in syngas even at ambient temperature, and complete removal of the carbonyls in an acid gas removal system using chemical solvents is very difficult, if not impossible. As a result, trace amounts of the metal carbonyls not removed from the syngas will pass to downstream components, often creating operating problems in a gas turbine by plating out in the gas turbine. To avoid such problems, numerous approaches have been developed to at least partially remove metal carbonyls from various gas streams.

In one approach, surfaces in contact with a gas stream containing the metal carbonyls may be coated with austenitic (18/8) stainless steel to avoid reaction with the metal carbonyls. While such a coating may reduce metal plating to at least some degree, use of stainless steel is relatively expensive. Furthermore, coating of surfaces susceptible to metal plating with stainless steel will not (at least to a significant degree) reduce the concentration of metal carbonyls in the gas stream and therefore only shift the problems associated with metal carbonyls to a location downstream of the stainless steel coating.

In another approach, Dvorak et al. employed spent catalysts comprising Cu and/or CuO and ZnO to reduce the concentration of sulfur compounds and iron carbonyl in a gas stream (Chemical Abstracts, Vol. 96 (1982), Abstract No. 164.903e). While the spent catalysts were relatively effective for removal of sulfur compounds, only small amounts of iron carbonyl were removed from the gases. Moreover, Cu and CuO sorbents are known to exhibit significant activity as hydrogenation catalysts. Consequently, when such catalysts are used in syngas, conversion of at least a portion of the syngas to methane and alcohols is almost unavoidable.

To improve reduction of iron carbonyl from a gas stream, the gas stream may be contacted with ZnO and/or ZnS as proposed in EP023911A2. ZnO and/or ZnS reduced the concentration of iron carbonyl to a significant extent (here: 99%), however, nickel carbonyl was removed in this system only to a significantly less degree (here: 77%). Alternatively, zeolites have been employed to reduce metal carbonyls from gas streams (Golden et al. Sep. Sci. and Techn. (1991), 26, 12: 1559-1574). Zeolites reduce the concentration of metal carbonyls from syngas with relatively high efficiency, however, the zeolites system described by Golden et al was limited to gas streams that are substantially free of hydrogen sulfide.

In a still further approach, as described in U.S. Pat. No. 5,451,384 to Carr, a gas stream containing metal carbonyls is contacted with lead oxide that is bound on a solid support (e.g., alumina). Lead oxide-based removal of metal carbonyls, and particularly iron carbonyl, is relatively effective, but however, has various significant disadvantages. Among other things, the gas stream typically needs to free of appreciable quantities of sulfur compounds to avoid sorbent poisoning. Furthermore, a highly toxic lead nitrate solution is employed to coat the carrier via a calcination process, which poses an environmental and health hazard. Moreover, operation of lead oxide beads at temperatures higher than 100° C. will tend to produce carbon deposits, especially in the absence of hydrogen.

To circumvent at least some of the problems associated with lead oxide, a hydrophobic porous adsorbent may be employed as described in U.S. Pat. No. 6,165,428 to Eijkhout et al. Suitable adsorbents include Si/Al-containing zeolites with a pore size of between about 0.5 nm to 4.0 nm and an average pore volume of 0.005 ml/g sorbent. Eijkhout's system may advantageously operate under conditions where the gas stream comprises significant amounts of hydrogen sulfide and water. However, effective removal of metal carbonyls is at least in part dependent on proper pore size. Moreover, Si/Al-containing zeolites are thought to act as molecular sieves. Consequently, disposal of saturated Si/Al-containing zeolites will still pose substantial health and environmental risks due to the high toxicity and low boiling point of metal carbonyls.

Therefore, although various configurations and processes are known in the art to remove metal carbonyls from a gas stream, all or almost all suffer from one or more disadvantages. Thus, there is still a need for improved configurations and processes for carbonyl removal.

SUMMARY OF THE INVENTION

The present invention is directed to a plant that includes a gas turbine receiving a feed gas that is passed through an adsorber in which a metal plates onto a sacrificial metal, wherein the feed gas in the adsorber has a temperature sufficient for plating the metal onto the sacrificial metal.

In one aspect of the inventive subject matter, the plant is an integrated gasification combined cycle (IGCC) plant, and at least a portion of the feed gas is produced from gasification of petroleum coke, visbreaker bottoms, asphaltenes, or vacuum bottoms. Consequently, the contemplated feed gas may comprise syngas.

In another aspect of the inventive subject matter, the metal carbonyl is selected from the group consisting of nickel carbonyl, iron carbonyl, and cobalt carbonyl. Thus, the contemplated metals are nickel, iron, and cobalt.

In a further aspect of the inventive subject matter, the sacrificial metal comprises iron, and preferably comprises steel turnings or steel shavings. Alternatively, the gas turbine has at least one of a turbine blade that comprises the sacrificial metal and a gas conduit that comprises the sacrificial metal.

In yet another aspect of the inventive subject matter the feed gas is heated by a gas turbine feed gas preheater, preferably to a temperature of about 270° C. to about 330° C. Moreover, contemplated configurations may include a second adsorber, wherein the second adsorber operates in series with the first adsorber.

Various objects, features, aspects and advantages of the present invention will become more apparent from the following detailed description of preferred embodiments of the invention, along with the accompanying drawing.

DETAILED DESCRIPTION

As used herein, the term "metal carbonyl" refers to a molecule in which a metal in ionic form forms a compound with $(CO)_n^-$, wherein n is typically between 1 and 8, and includes mixed metal carbonyls, in which at least one $(CO)_n^-$ and one other anion form the compound. Particularly contemplated metal carbonyls include nickel carbonyl ($Ni(CO)_4$), iron carbonyl ($Fe(CO)_5$), and cobalt carbonyl ($(CO)_3Co:(CO_2:Co$ (CO)₃). Consequently, particularly contemplated metals include nickel, iron, and cobalt.

As also used herein, the term "the metal plates" refers to the decomposition of a metal carbonyl (which may be in gas and/or liquid phase) and the concomitant deposition of the metal, wherein the metal deposits in elemental form on the sacrificial metal.

As further used herein, the term "sacrificial metal" refers to various metals in pure form or alloyed with at least one alloying element, however, particularly excluding copper. Especially preferred sacrificial metals include iron, most preferably as the predominant component.

In a particularly preferred aspect of the inventive subject matter, as depicted in FIG. 1, a plant 100 includes a gas turbine 110 that is coupled to a power generator 120. The gas turbine 110 is driven by combustion of feed gas 130, which is preferably preheated by gas turbine feed gas preheater 140 to a temperature of about 300° C. Downstream of the preheater 140 are two adsorbers 150A and 150B in series, wherein each of the adsorbers comprises sacrificial metal 152A and 152B, respectively. Furthermore, each of the adsorbers 150A and 150B include a bypass 154A an 154B, respectively, such that one or both adsorbers can be replaced while maintaining continuous flow of the (preheated) feed gas to the gas turbine 110.

With respect to contemplated plants, it should be appreciated that a particular nature of the plant is not limiting to the inventive subject matter. However, it is generally preferred that suitable plants include a gas turbine, and particularly preferred plants are IGCC plants. Thus, it is contemplated that the gas turbine is coupled to a power generator. There are numerous power generators known in the art, and all of the known power generators are contemplated suitable for use herein. Similarly, there are numerous gas turbines known in the art, and all of the known gas turbines are contemplated suitable for use herein. Exemplary gas turbines include various air-cooled gas turbines, water-cooled gas turbines, and/or integrated steam cooled gas turbines (see e.g., U.S. Pat. No. 4,424,668).

In further aspects of the inventive subject matter, the nature of suitable feed gas may vary considerably, and it is generally contemplated that all gas streams are suitable that (a) can be partially or entirely employed as gas to drive a gas turbine, (b) can be employed for synthesis purposes (e.g., methanol or ammonia manufacture) and (c) will comprise at least temporarily a metal carbonyl. However, especially preferred feed gases include gases formed in a gasification reaction that employs gasification of hydrocarbonaceous materials, and especially heavy oil refinery residues. For example, suitable gasification materials for generation of contemplated feed gases include petroleum coke, visbreaker bottoms, asphaltenes, or vacuum bottoms. Alternatively, numerous other refinery fraction or residues are also considered suitable.

Furthermore, it should be recognized that suitable feed gases may have been treated in one or more processes that change the chemical composition of the feed gas. For example, contemplated feed gases may be subjected to one or more shift conversions prior to entering the turbine. Alternatively, or additionally, it is contemplated that the feed gas may be subjected to an acid gas removal process (which may or may not completely remove sulfurous compounds in the feed gas). Consequently, a particularly preferred feed gas is a syngas from a gasification of refinery residues after shift conversion and acid gas removal.

Moreover, the feed gas may in further preferred aspects also be subjected to a cooling or heating step, and it is especially preferred that the feed gas is heated in a gas turbine feed gas preheater to a temperature of about 100° C. to 400° C., more preferably to a temperature between about 200° C. to 380° C., even more preferably to a temperature between about 250° C. to 350° C., and most preferably to a temperature of about 300° C. There are numerous gas turbine feed gas preheaters known in the art, and all of those are considered suitable for use herein.

With respect to the absorber, it is generally contemplated that suitable adsorbers may have any configuration and/or dimension so long as the contemplated adsorbers include at least some sacrificial metal, receive a feed gas, and provide the feed gas after contacting the sacrificial metal to a gas turbine. However, in a particularly preferred aspect of the inventive subject matter, the adsorber comprises a pipe with a diameter of about two times the diameter of the syngas pipe and a length of about ten times the diameter of the syngas pipe, wherein the adsorber is filled with steel shavings and/or steel turnings.

Preferred adsorbers are positioned downstream of a gas turbine feed gas preheater (e.g., a syngas preheater), and upstream of the gas turbine. While not limiting to the inventive subject matter, it is especially preferred that contemplated plants include at least two adsorbers (which may be in parallel/adjacent position relative to each other), which are fluidly coupled in series such that a first adsorber receives the preheated feed gas, and provides a substantially metal carbonyl depleted (i.e., at least 95 mol %, more typically at least 98 mol %, most typically at least 99 mol %) feed gas to the second adsorber, which in this configuration acts as a guard bed and provides the substantially metal carbonyl depleted feed gas to the gas turbine. Furthermore, it is especially preferred that in such configurations the first and second adsorbers are fluidly coupled to the gas turbine using bypass piping such that (a) the first adsorber can be removed from the plant while the feed gas is continuously provided to the gas turbine via the second adsorber, and (b) that after removing the first adsorber and installing a replacement adsorber with a fresh batch of sacrificial metal the second adsorber will act as the leading adsorber (i.e., as the first adsorber).

In alternative configurations, however, the number of adsorbers may vary considerably, and appropriate configurations may include between one and six adsorbers, and even more. For example, where a gas turbine receives a discontinuous supply of feed gas, only one adsorber may be employed. On the other hand, where substantially complete depletion of a continuous supply of feed gas is required, three and even more adsorbers may be employed.

Consequently, depending on the particular number and configuration of adsorbers, two or more adsorbers may be operated in series, in parallel, or in a mixed mode (some adsorbers serial and other adsorbers parallel). However, it is generally preferred that operation of two or more adsorbers will allow for continuous flow of the feed gas (and thereby continuous removal of metal carbonyl from the feed gas) to the gas turbine gas.

Alternatively, and especially where the feed gas comprises syngas that is employed for synthesis of industrial products (e.g., ammonia, methanol, or other alcohols) or hydrogen production, it is contemplated that preferred locations of the adsorber or adsorbers are upstream of a synthesis loop or synthesis reactor. Thus, it should be appreciated that such configurations advantageously reduce the concentration of metal carbonyls in the synthesis process, which may adversely affect catalyst performance due to the build-up of the metal carbonyls (and metals) on the surface of the catalyst.

With respect to the sacrificial metal in the adsorber it is particularly preferred that the sacrificial metal (or metal alloy) comprises iron, and most preferably comprises steel shavings and/or turnings. It should be especially appreciated that the use of contemplated sacrificial metals not only allows for efficient removal of metal carbonyls from the feed gas (infra), but also converts the highly toxic metal carbonyls to non-toxic plated metal and CO and/or $CO_2$. Thus, disposal of the sacrificial metal after saturation with plated metal is environmentally safe and does generally not present a health hazard.

In alternative aspects of the inventive subject matter, suitable sacrificial metals and metal alloys need not be restricted to iron comprising metals, and particularly suitable alternative sacrificial metals include all metals and metal alloys onto which a metal plates from a metal carbonyl (plating conditions include temperatures between 0° C. and several hundred ° C. at pressures between atmospheric pressure and several ten thousand psig). Thus, it is contemplated that the sacrificial metal may also be any metal that is present in the gas turbine (e.g., the turbine blade or gas conduit) onto which a metal would plate from a metal carbonyl contained in the feed gas.

Furthermore, it should be appreciated that contemplated adsorbers may include additional materials or implements that assist in removal and/or plating of a metal from the metal carbonyl. Thus, especially preferred materials include zeolites, which may or may not be coated with metal oxides, and contemplated implements may include electrodes or electrical coupling to the sacrificial metal to promote deposition of a metal from a metal carbonyl (e.g., via electrodeposition). Furthermore, the contact surface of the sacrificial metal to the feed gas may be enlarged by various methods, and all known methods of increasing a contact surface to a gas are considered suitable for use herein (e.g., introducing porosity, formation of microspheres, etc.).

It is generally contemplated that kinetics and quantity of removal of the metal carbonyl from the feed gas will at least in part depend on the initial concentration of the metal carbonyl in the feed gas, the temperature of the feed gas when the feed gas contacts the sacrificial metal, and the type of metal employed. However, it is generally contemplated that when the sacrificial metal comprises steel shavings and/or steel turnings, and the feed gas comprises a gas from a gasification of a hydrocarbonaceous material, substantially complete removal (i.e., removal of at least 95 mol %, more typically at least 98 mol %, most typically at least 99 mol %) of the metal carbonyl can be achieved by employing sufficient amounts of sacrificial metal at elevated temperatures (typically between about 100-400° C., most preferably about 300° C.).

It should still further be recognized that while contemplated configurations and processes are particularly advantageous for plants in which a turbine receives a metal carbonyl containing feed gas, that numerous alternative configurations and processes are also contemplated. Suitable alternative configurations and processes include all configurations and processes in which a metal carbonyl containing gas contacts a surface under conditions that enable at least partial plating of the metal carbonyl onto the surface, and wherein plating of the metal carbonyl is generally considered undesirable or even detrimental to the surface.

For example, numerous synthetic processes (e.g., ammonia synthesis, synthesis of single or mixed alcohols, or Fischer-Tropsch synthesis of hydrocarbons and hydrogen production) include metal containing catalysts, which can be poisoned by plating of a metal from a metal carbonyl. Therefore, it is contemplated that alternative surfaces include synthesis catalysts, and vessels containing such catalysts. Furthermore, it is contemplated that pipelines, vessels, valves, and other components conveying feed gas containing a metal carbonyl can be protected using adsorbers according to the inventive subject matter. In a still further preferred aspect, it is contemplated that configurations and methods according to the inventive subject matter may also be employed to remove or at least reduce the concentration of metal carbonyls from a gas that is vented into an environment (e.g., plant or atmosphere) to protect the environment.

Therefore, contemplated plants may also include a device that receives a feed gas, and an adsorber that is upstream and fluidly coupled to the device, wherein a metal plates from a metal carbonyl contained in the feed gas onto a sacrificial metal in the adsorber, and wherein the feed gas in the adsorber has a temperature sufficient for plating the metal onto the sacrificial metal. In particularly contemplated aspects, the plant may include a metal catalyst for a synthesis process, and/or a reaction vessel or a pipeline receiving a synthesis gas.

Thus, specific embodiments and applications of improved configurations and processes for carbonyl removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of reducing a metal carbonyl concentration in a feed gas for a gas turbine, comprising:
   providing a feed gas that includes a metal carbonyl;
   heating the feed gas upstream of the adsorber to a temperature of about 270° C. to about 330° C.;
   contacting the feed gas in an adsorber with a sacrificial metal at a temperature sufficient to plate a metal from the metal carbonyl onto the sacrificial metal, thereby producing a purified feed gas; and
   providing the purified feed gas to a gas turbine.

2. The method of claim 1 wherein at least a portion of the feed gas is produced from gasification of a material selected from the group consisting of petroleum coke, visbreaker bottoms, asphaltenes, and vacuum bottoms.

3. The method of claim 1 wherein the feed gas comprises syngas.

4. The method of claim 1 wherein the metal carbonyl is selected from the group consisting of nickel carbonyl, iron carbonyl, and cobalt carbonyl.

5. The method of claim 1 wherein the sacrificial metal comprises iron.

6. The method of claim 1 wherein the feed gas is heated by a gas turbine feed gas preheater.

7. The method of claim 1 wherein the metal from the metal carbonyl is nickel, iron, or cobalt.

* * * * *